(12) United States Patent
Miura

(10) Patent No.: US 7,547,656 B2
(45) Date of Patent: Jun. 16, 2009

(54) EXHAUST GAS CLEANING CATALYST

(75) Inventor: Masahide Miura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 855 days.

(21) Appl. No.: 10/889,042

(22) Filed: Jul. 13, 2004

(65) Prior Publication Data

US 2005/0014638 A1 Jan. 20, 2005

(30) Foreign Application Priority Data

Jul. 15, 2003 (JP) ............................... 2003-197245

(51) Int. Cl.
*B01J 23/00* (2006.01)
*B01J 21/00* (2006.01)
*B01J 20/00* (2006.01)
*B01J 29/00* (2006.01)

(52) U.S. Cl. .................. 502/327; 502/302; 502/303; 502/304; 502/332; 502/333; 502/334; 502/339; 502/349; 502/350; 502/355; 502/415; 502/439; 502/527.12; 502/527.13

(58) Field of Classification Search ............. 502/240, 502/302, 303, 304, 349, 350, 355, 415, 439, 502/527.12, 527.13, 327, 332, 333, 334, 502/339
See application file for complete search history.

(56) References Cited

U.S. PATENT DOCUMENTS

| | | | | |
|---|---|---|---|---|
| 3,565,830 A | * | 2/1971 | Keith et al. | 502/242 |
| 4,252,690 A | * | 2/1981 | Kamiya et al. | 502/315 |
| 4,680,282 A | * | 7/1987 | Blanchard et al. | 502/304 |
| 4,792,433 A | * | 12/1988 | Katsura et al. | 422/98 |
| 5,128,306 A | * | 7/1992 | Dettling et al. | 502/304 |
| 5,439,865 A | | 8/1995 | Abe et al. | |
| 5,472,591 A | * | 12/1995 | Saito et al. | 204/429 |
| 5,492,612 A | * | 2/1996 | Kennard et al. | 204/429 |
| 5,556,825 A | * | 9/1996 | Shelef et al. | 502/303 |
| 7,119,046 B2 | * | 10/2006 | Ohno et al. | 502/327 |
| 2003/0083193 A1 | * | 5/2003 | Takaya et al. | 502/304 |
| 2004/0087439 A1 | * | 5/2004 | Hwang et al. | 502/302 |
| 2006/0014636 A1 | * | 1/2006 | Ichikawa et al. | 502/243 |

FOREIGN PATENT DOCUMENTS

| | | |
|---|---|---|
| EP | 1 175 935 A2 | 1/2002 |
| JP | A 61-245850 | 11/1986 |
| JP | A 2001-205109 | 7/2001 |
| JP | A-2004-330025 | 11/2004 |

* cited by examiner

*Primary Examiner*—Cam N. Nguyen
(74) *Attorney, Agent, or Firm*—Oliff & Berridge PLC

(57) ABSTRACT

An exhaust gas cleaning catalyst comprising: a carrier substrate; a catalyst carrying layer formed on the carrier substrate; and a noble metal catalyst carried by the catalyst carrying layer; wherein said catalyst carrying layer comprises at least two layers, and of the at least two layers, lower layer on the side of the carrier substrate is a metal oxide layer with porosity of 40~75% and upper layer on the side of the top surface is a metal oxide layer having thermal conductivity of 5 W/mK or less.

10 Claims, 1 Drawing Sheet

EXHAUST GAS CLEANING CATALYST

BACKGROUND OF THE INVENTION

1. Field of the Invention

The present invention relates to a catalyst for cleaning exhaust gas discharged from an internal combustion engine and, more particularly, to an exhaust gas cleaning catalyst that can be promptly activated immediately after the start of the engine.

2. Description of the Related Art

Various types of catalysts have been proposed for cleaning and removing components such as nitrogen oxides, carbon monoxide, hydrocarbons, and the like, contained in exhaust gas discharged from an internal combustion engine such as an automobile engine.

A representative type among these exhaust gas cleaning catalysts is an exhaust gas cleaning catalyst consisting of a carrier substrate such as a honeycomb substrate of cordierite, having a multiplicity of cells, and which has, on the surface of the exhaust gas channels thereof, a coating of a catalyst carrier layer selected from metal oxides such as alumina, zirconia, ceria and the like, with metal selected from platinum (Pt), palladium (Pd), rhodium (Rh), and the like, carried by the catalyst carrier layer (see, for example, Japanese Patent Publication No. 2001-205109).

However, in order to make full use of the function of such an exhaust gas cleaning catalyst, it is necessary to raise temperature of the catalyst above its activation temperature. Thus, in an atmosphere at a low temperature such as that found immediately after engine start, the catalyst is not always in an activated state and exhaust gas cleaning capability of the catalyst cannot be fully utilized. There is, therefore, a problem that the capability of a catalyst can be fully utilized only when the temperature of the catalyst is raised above a certain activation temperature.

SUMMARY OF THE INVENTION

It is an object of the present invention to provide an exhaust gas cleaning catalyst which has improved warming-up performance when warming up to an activation temperature and is, thus, capable of being activated promptly at the time of engine start.

In order to overcome the above-described problem, in accordance with the present invention, there is provided an exhaust gas cleaning catalyst comprising a carrier substrate, a catalyst-carrying layer formed on the carrier substrate, and a noble metal catalyst carried by the catalyst carrying layer, wherein the catalyst-carrying layer is composed of at least two layers, of which the lower layer on the side of the carrier substrate is a layer of a metal oxide having porosity of 40~75%, and the upper layer on the side of the top surface is a layer of a metal oxide with thermal conductivity of 5 W/mK or less.

DESCRIPTION OF THE PREFERRED EMBODIMENT

Figure 1:
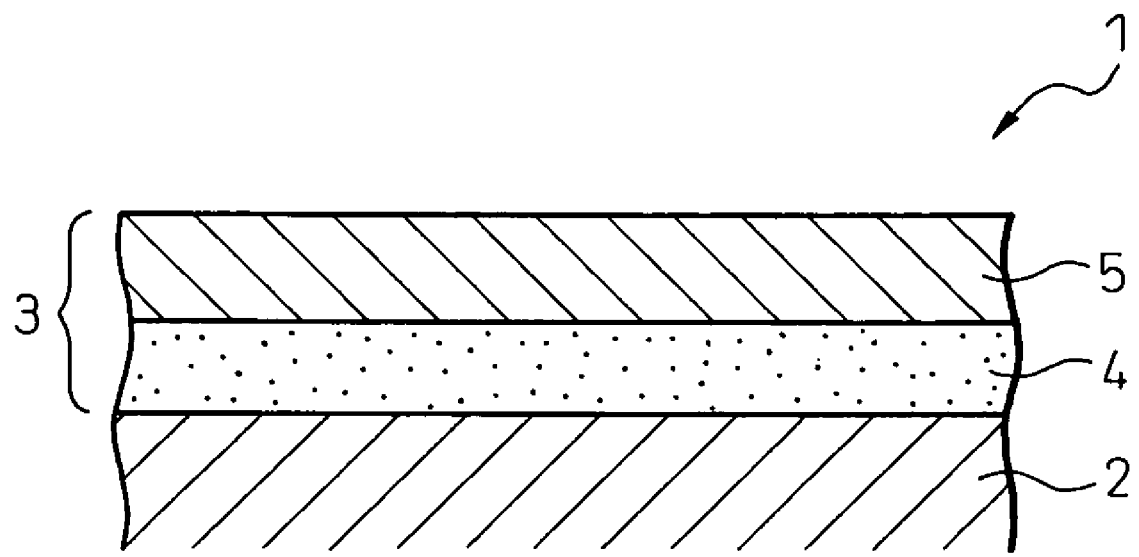
FIG. 1 is a partially sectional view showing the structure of an exhaust gas cleaning catalyst according to the present invention.

Now, an exhaust gas cleaning catalyst of the present invention will be described in more detail with reference to the drawing. FIG. 1 is a partially sectional view showing the structure of an exhaust gas cleaning catalyst of the present invention. The exhaust gas cleaning catalyst 1 is comprised of a carrier substrate 2, a catalyst carrying layer 3 formed on the carrier substrate, and a noble metal catalyst carried by the catalyst carrying layer. The catalyst carrying layer 3 includes at least two layers, i.e. a lower layer 4 and an upper layer 5, and may include one or more additional layers (not shown) between the lower layer 4 and the upper layer 5.

The carrier substrate 2 may be formed using any known substrate material used for an exhaust gas cleaning catalyst, for example, a ceramic material having thermal resistance such as cordierite, alumina, zirconia, silicon carbide, etc., or a metallic material such as stainless steel, etc., preferably in the form of a honeycomb substrate, and a honeycomb substrate formed of cordierite having excellent thermal resistance and low thermal expansion coefficient is particularly preferable. Such a honeycomb substrate has preferably a large number of cells with openings at both ends. The density of the cells in the honeycomb substrate is not particularly restricted, but a so-called medium density honeycomb with about 200 cells/inch$^2$ or a high density honeycomb with 1000 cells/inch$^2$ or higher, is preferably used. The cross sectional shape of cells is not particularly restricted, and circular, rectangular, hexagonal or circular cross-sectional shape may be used.

The lower layer 4 of the catalyst carrying layer 3 is, as shown in the Figure, disposed on the side of the carrier substrate 2, and is formed of a metal oxide. At least one type of metal oxide selected from zirconia, ceria, titania, silica, magnesia, alumina, and composite oxide thereof may be used to form the lower layer. Among them, ceria zirconia composite oxide is particularly preferable. The lower layer 4 is porous, and is required to have porosity in the range of 40~75%. Here, the value of porosity is obtained from measurement using a mercury porosimeter, and is calculated in accordance with the following formula:

$$\text{Porosity} = (\text{porosity of the carrier substrate coated with the lower layer}) - (\text{porosity of the carrier substrate}).$$

The average pore diameter in the lower layer 4 is preferably about 2 μm, and thickness of the lower layer 4 is preferably about 60 μm on average. A high porosity of the lower layer 4 is advantageous in that it increases thermal insulation so that the catalyst warmed during warming-up can be kept warm and heat flow to the carrier substrate is suppressed so that heat storage capability at the time of cold start can be improved.

The upper layer 5 of the catalyst carrying layer 3 is, as shown in the Figure, disposed on the side of top surface, that is, on the side of the exhaust gas passage channel, and is formed of a metal oxide. The metal oxide is selected from the group of metal oxides having thermal conductivity of 5 W/mK or lower, and is selected from zirconia, and stabilized zirconia added with 1~10 wt % yttoria, calcium, or alumina. Yttoria-stabilized zirconia is particularly preferred. Here, thermal conductivity is measured by a laser flash method using a non-contact thermometer. The upper layer 5 is also preferably porous because it carries a noble metal catalyst, and is preferably relatively dense in order to store heat efficiently during engine warming-up. Thus, it is preferable that the porosity of the upper layer 5 is about 20%, and the pore diameter is preferably about 1 μm. Thickness of the upper layer 5 is preferably 20~50 μm, and is more preferably 20~30 μm.

One or more intermediate layers may be provided between the lower layer 4 and the upper layer 5. Various metal oxides which have been conventionally used for catalyst carrying layer, for example, silica, alumina, zirconia, ceria, etc., may be used as the intermediate layer. The intermediate layer is preferably a layer that is capable of preventing a reaction between the lower layer 4 and the upper layer 5.

A noble metal catalyst is carried by the lower layer 4 and the upper layer 5, and the intermediate layer, if any. As the noble metal catalyst, at least one noble metal selected from Pt, Pd, Rh, Ir, is preferably used. The amount of the carried noble metal catalyst is not particularly restricted, and is preferably 0.1~10 g per 100 g of the catalyst carrying layer. If the amount is less than 0.1 g, sufficient catalyst activity cannot be obtained and, if the amount exceeds 10 g, the activity does not increase with an increasing amount of the catalyst component, and the cost increases.

Next, a method of fabricating the exhaust gas cleaning catalyst of the present invention will be described.

First, a carrier substrate is provided. A commercially available carrier substrate may be used, or a carrier substrate may be molded by an extrusion method or the like.

Next, a lower layer is formed on the cell inner wall of the carrier substrate. The lower layer 4 can be formed using a general wash coat method for forming a catalyst carrying layer. Thus, metal oxides of desired compositions are pulverized to micro-particles, and the slurry containing the micro-particles is coated onto the cell inner wall of the carrier substrate, is dried and fired to form the lower layer 4.

With this method, however, preparation of micro-particles necessitates processes of pulverizing metal oxide and adjusting particle size and, as micro-particles tend to coagulate in a slurry, it is difficult to coat the metal oxide thinly and uniformly on the cell inner wall of the carrier substrate. Therefore, it is preferable to form the lower layer using any one of the following three methods.

In the first method, an acid solution of a metal salt is first coated on the cell inner wall of the carrier substrate, and then is reacted with an alkaline solution to precipitate or co-precipitate the metal salt on the cell inner wall as a metal hydroxide or the like. The co-precipitated metal hydroxide or the like is dried and is further heated and fired to form the metal oxide carrying layer on the cell inner wall of the carrier substrate. The metal oxide that is used in this method is preferably one or more type selected from the group consisting of cerium nitrate, zirconium nitrate, yttrium nitrate, and aluminum nitrate. In conjunction with these acid metal salts, a solution or slurry formed by mixing a material such as a metal oxide sol, for example, zirconia sol, may be used. In this method, an alkaline solution that is capable of reacting with a acid metal salt solution to form precipitation or co-precipitation reaction product in the form of metal hydroxide or the like. As such an alkaline solution, aqueous ammonia, aqueous urea, or aqueous solution of sodium hydroxide is preferably used. When the acid metal salt coated on the cell inner wall of the carrier substrate is reacted with an alkaline solution, for example, when a solution containing cerium nitrate and zirconia sol is reacted in co-precipitation reaction with an alkaline solution to form an oxide containing two or more metals, ultrasonic vibration is preferably applied in the co-precipitation reaction, because co-precipitation under application of ultrasonic vibration produces uniform composite metal oxide coating layer on the cell inner wall without giving rise to phase separation of respective metal oxides. Depending upon the type of materials used, however, when uniform metal oxide coating layer is formed on the cell inner wall of the carrier substrate without application of ultrasonic vibration, the ultrasonic vibration is not necessarily required. Here, the term "uniformt" means that, in the carrier substrate coated with a metal oxide, there is little or no area of the surface that is not coated with the metal oxide. When the acid metal salt solution contains only one metal, the precipitation reaction of the acid metal salt and an alkaline solution on the cell inner wall can be also carried out uniformly under the application of ultrasonic vibration, and a uniform carrying layer of the metal oxide can be advantageously formed.

More specifically, in the above method, for example, the carrier substrate is soaked in an acid metal salt solution or slurry to coat the acid metal salt solution or slurry onto the cell inner wall of the carrier substrate. Then, the carrier substrate is, after removing the excess residual solution or slurry, further soaked in an aqueous ammonia, preferably under application of ultrasonic vibration, to precipitate or co-precipitate the metal in the form of a metal hydroxide or the like. The metal hydroxide or the like formed in this precipitation or co-precipitation reaction is then dried and fired. Drying is preferably performed at 120° C. for 1 hour, and firing is preferably performed at 400° C. for 1 hour. Firing produces a coated carrying layer of the metal oxide on the surface of the cell inner wall of the carrier substrate.

In the second method of forming a carrying layer of metal oxide on the cell inner wall of the carrier substrate, a sol solution obtained by hydrolysis condensation of a metal alkoxide is coated onto the cell inner wall of the carrier substrate. After removing the excess residual sol solution adhered to the carrier substrate, the sol solution coated on the cell inner wall is dried, and is further heated and fired to be dehydrated to form a carrying layer of the metal oxide on the surface of the cell inner wall of the carrier substrate. As the metal alkoxide used in this method, any metal alkoxide, that can be fired to form the desired metal oxide, may be selected and used. Specific examples of useful metal alkoxide include alkoxides of Si, Al, Zr. Production of a sol by hydrolysis condensation of a metal alkoxide, and of a metal oxide by firing of the sol, has been known to those skilled in the art as the so-called sol-gel method, and any known technique may be optionally utilized for this purpose. Also in this method as in the first method described above, application of ultrasonic vibration to the sol solution can be effectively used to form a uniform carrying layer of metal oxide on the surface of the cell inner wall of the carrier substrate. An example of the preferable conditions for drying and firing of the sol solution coated on the cell inner wall of the carrier substrate is drying at 100~150° C. and firing at 300~400° C. in an air atmosphere.

In the third method of forming a carrying layer of metal oxide on the cell inner wall of the carrier substrate, a mixture of an acid metal salt solution and a sol solution as raw material for the metal oxide is coated on the cell inner wall of the carrier substrate, and, after an excess of the mixture is removed from the carrier substrate, the coated mixture is further heated and fired to remove water and to form a carrying layer of metal oxide. One or more substances selected from the group consisting of cerium nitrate, zirconium nitrate, yttrium nitrate, and aluminum nitrate are preferably used as the acid metal salt used in this method. As the sol solution used in this method, in addition to a sol solution prepared by hydrolysis and partial condensation of a metal alkoxide, various commercially available sol solutions may be used. Examples of commercially available sol solutions include NEEDLAL manufactured by Taki Chemical Co. and Aluminasol AC200 manufactured by Nissan Chemical Industries Co.

Also in the third method, a uniform carrying layer of metal oxide can be formed on the surface of the cell inner wall effectively when a mixture of an acid metal salt solution and a sol solution is coated onto the cell inner wall of the carrier substrate under application of ultrasonic vibration. After a mixture of an acid metal salt solution and a sol solution is coated onto the cell inner wall of the carrier substrate, drying and firing are performed preferably at 100~150° C. and at 300~400° C. under an air atmosphere, respectively.

It is necessary that the lower layer has porosity of 40~75% and, in order to achieve such a porosity in the above-described method, in which the cell inner wall of the carrier substrate is impregnated with a solution or slurry containing a metal salt or the like as the raw material to prepare a metal oxide, and then the metal oxide is synthesized on the cell inner wall, one or more component (hereinafter also referred to as "polymer etc".) selected from the group consisting of soluble polymers, polymer powders, and surfactants, can be added to the solution or slurry containing the metal salt or the like, and the resulting solution or the slurry can be coated onto the cell inner wall and heated on the cell inner wall to form a carrying layer of metal oxide. Thus, when the metal oxide is synthesized by firing, the polymer etc. contained in the raw material of the metal oxide is removed by evaporation or decomposition, and can act as a pore producing agent so as to leave fine pores in the carrying layer of metal oxide.

Thus, fine pores can be formed in the carrying layer of metal oxide, by one of the following three methods: (1) to an acid metal salt solution, one or more substances selected from the group consisting of soluble polymers, polymer powders, and surfactants are added, and after the resulting solution or slurry is coated onto the cell inner wall of the carrier substrate, it is reacted with an alkaline solution and is further fired to form a carrying layer of metal oxide on the surface of the cell inner wall of the carrier substrate, (2) to a sol solution obtained by hydrolysis and partial condensation of a metal alkoxide, one or more substances selected from the group consisting of soluble polymers, polymer powders, and surfactants are added, and after the resulting solution is coated onto the cell inner wall of the carrier substrate, it is further fired to form a carrying layer of metal oxide on the surface of the cell inner wall of the carrier substrate, and (3) to a mixture of acid metal salt solution and a sol solution obtained by hydrolysis and partial condensation of a metal alkoxide, one or more substances selected from the group consisting of soluble polymers, polymer powders, and surfactants are added, and the resulting mixture is coated onto the cell inner wall of the carrier substrate, and is further fired to form a carrying layer of metal oxide on the surface of the cell inner wall of the carrier substrate.

As "soluble polymer", "polymer powder", and "surfactant" used in the above-described methods any material may be used as long as it can form fine pores in the carrying layer of metal oxide. Specific examples are given below, although the present invention is not limited to these examples. As "soluble polymer" used in the above-described methods, one or more selected from polyethylene oxide with molecular weight of 5000~10000 and polyvinyl alcohol with molecular weight of 5000~10000 is preferably used, and it is particularly preferable to use polyvinyl alcohol that exhibits good dispersion in water. As "polymer powder", polyethylene powder of average particle diameter of 0.1~10 μm, for example, is preferably used. As "surfactant", one or more surfactants selected from the various surfactants known as anion type, cation type, amphoteric type, and nonionic type surfactants may be used. Nonionic type surfactants include, for example, aliphatic soaps, N-acyl amino acid and salt thereof, polyoxyethylene alkyl ether carboxylate, sulfonates such as alkyl naphthalene sulfonate, naphthalene sulufonate formalin polycondensation product, melamine sulfonate formalin polycondensation product, dialkyl sulfosuccinate, sulufosuccinic acid dialkylate, polyoxyethylene dialkyl sulfosuccinate, alkyl sulfoacetate, α-olefin sulfonate, N-acyl-N-methyl taurin, dimethyl-5-sulfoisophthalate sodium, sulfuric acid esters such as higher alcohol sulfuric acid esters, secondary higher alcohol sulfuric acid ester, polyoxyethylene alkyl ether sulfate, secondary higher alcohol ethoxy sulfate, polyoxyethylene alkyl phenyl ether sulfate, secondary higher alcohol ethoxy sulfate, polyoxyethylene alkyl phenyl ether sulfate, (monoglysulfate), fatty acid alkylol amide sulfate, as well as phosphoric acid esters such as polyoxyethylene alkyl ether phosphate, polyoxyethylene alkyl phenyl ether phosphate, alkyl phosphate. Cation type surfactants include, for example, aliphatic amine salts, aliphatic quaternary ammonium salts, benzalkonium chloride, benzethonium chloride, pyridinium salts, and imidazolinium salts. More specifically, cation type surfactants include, for example, Armac C, Armac HT, and Armac T50 (these are all trademarks), manufactured by Lion Co. Amphoteric type surfactants include, for example, carboxybetaine type, amino carboxylates, imidazolinium betaine, lecithin, and alkylamineoxide. Nonion type surfactants include, for example, ether type such as polyoxyethylene alkyl ether, polyoxyethylene alkyl phenyl ether, polyoxyethylene sterol ether, polyoxyethylene lanoline derivatives, ethyleneoxide derivatives of alkyl phenol formalin condensation product, polyoxyethylene polyoxypropylene block copolymer, and polyoxyethylene polyoxypropylene alkyl ether, ester ether type such as polyoxyethylene glycerol fatty acid ester, polyoxyethylene castor oil and hydrogenated castor oil, polyoxyethylene sorbitan fatty acid ester, polyoxyethylene sorbitol fatty acid ester, and polyoxyethylene fatty acid alkanol amidesulfate, ester type such as (poly)ethylene glycol fatty acid ester, (poly)glycerol fatty acid ester, sorbitan fatty acid ester, propylene glycol fatty acid ester, and sucrose fatty acid ester, and nitrogen containing surfactants such as aliphatic alkanol amide, polyoxyethylene aliphatic amide, polyoxyethylene alkyl amine.

One or more substances selected from the group consisting of soluble polymers, polymer powders, and surfactants (herein after referred to as "polymer etc.") are added in an amount sufficient for achieving porosity of 40~75% in the carrying layer of metal oxide. Specifically, the polymer etc. is added in an amount of 10~15 parts by weight relative to 100 parts by weight of the acid metal salt solution, the sol solution obtained by hydrolysis and partial condensation of the metal alkoxide, or the mixture of an acid metal salt solution and said sol solution.

After the lower layer is formed in this manner, a noble metal catalyst is carried by the lower layer. Any known method for causing a metal to be carried by a metal oxide may be chosen and used to carry the noble metal catalyst, including, but not being limited to, the following exemplary method in which an aqueous metal salt solution of the noble metal to be carried is absorbed and carried by the lower layer, which can be then dried and fired. In order for a noble metal to be carried by the lower layer, a carrying layer of metal oxide may be first formed on the surface of the cell inner wall of the carrier substrate, and then aqueous solution of the noble metal salt may be absorbed and carried by the carrying layer of metal oxide. Alternatively, a solution having the salt of the noble metal dissolved therein, together with solution or slurry containing the acid metal salt as the raw material for forming a carrying layer of metal oxide, a sol solution obtained by hydrolysis and partial condensation, or a mixture of the acid metal salt solution and said sol solution may be coated onto the cell inner wall of the carrier substrate, can be coated onto the cell inner wall of the carrier substrate, and can be further fired to form a carrying layer of the metal oxide as well as to cause the noble metal to be carried by the carrying layer. This method is preferable since number of steps for fabricating the exhaust gas cleaning catalyst can be reduced.

In the same manner, but without adding "polymer etc.", an intermediate layer for carrying a noble metal can be formed on the lower layer, and finally an upper layer for carrying a noble metal can be formed on top of it to complete an exhaust gas cleaning catalyst of the present invention.

EXAMPLE

Example 1

Upper Layer: ZrO2-YO2 for Carrying Pt—Rh,
Lower Layer: CZY for Carrying Pt—Rh (1) Formation of the Lower Layer A ceramic honeycomb of 100 mm in diameter and 150 mm in length with 500 cells/inch$^2$ manufactured by Japan Glass Industry Co. was provided as a carrier substrate.

To 100 parts by weight of CZY Powder (trademark) manufactured by Cataler Co. and crushed in a ball mill for 100 hours, 10 parts by weight in solid mass of zirconia sol (AC-7, manufactured by Daiichi Kigenso Chemical Industries Co.) and a suitable amount of ion exchanged water were added and were mixed in a ball mill for one hour to prepare a slurry. To 100 parts by weight of this slurry, 15 wt % of polyethylene powder of 1 µm in diameter was added. The aforesaid carrier substrate was immersed in this slurry to coat the slurry onto the cell inner wall of the substrate. Then, excess slurry was blown off with air, and after the substrate was heated at 200° C. to evaporate polyethylene powder, firing was performed at 500° C. Finally, the carrier substrate having the lower layer formed thereon was immersed in Pt/Rh solution which had its concentration adjusted to 1.5/0.3 (g/L), and was fired to form the catalyst carrying lower layer.

(2) Formation of the Upper Layer

To 100 parts by weight of zirconia powder, 5 parts by weight in solid component of yttria sol (manufactured by Taki Chemical Co.), 10 parts by weight of zirconia sol (AC-7, manufactured by Daiichi Kigenso Chemical Industries Co.), and ion exchanged water were added to achieve solid content of 50.5%, and were mixed in a ball mill for 24 hours to prepare a slurry. The carrier substrate having the lower layer prepared thereon as described above was immersed in this slurry to coat the slurry on the lower layer. Then, excess slurry was blown off with air, and the substrate was dried by heating in an electric furnace at 120° C. for one hour. Finally, the substrate was immersed in Pt/Rh solution which had its concentration adjusted to 1.5/0.3 (g/mL), and then was fired to obtain a catalyst.

Example 2

A catalyst was prepared in the same manner as in Example 1, except that the upper layer was formed of zirconia and in different thickness. Thus, to 100 parts by weight of zirconia powder, 10 parts by weight in solid component of zirconia sol (AC-7, manufactured by Daiichi Kigenso Chemical Industries Co.), and ion exchanged water were added to achieve solid content of 50.5%, and mixed in a ball mill for 24 hours to prepare a slurry. The carrier substrate having the lower layer prepared thereon as described in Example 1 was immersed in this slurry to coat the slurry on the lower layer. Then, excess slurry was blown off with air, and the substrate was dried by heating in an electric furnace at 120° C. for one hour. Finally, the substrate was immersed in Pt/Rh solution which had its concentration adjusted to 1.5/0.3 (g/mL), and then was fired to obtain a catalyst.

Example 3

A catalyst was prepared in the same manner as in Example 2, except that the upper layer was formed in different thickness. Thus, to 100 parts by weight of zirconia powder, 10 parts by weight in solid component of zirconia sol (AC-7, manufactured by Daiichi Kigenso Chemical Industries Co.), and ion exchanged water were added to achieve solid content of 52.5%, and mixed in a ball mill for 24 hours to prepare a slurry. The carrier substrate having the lower layer prepared thereon as described in Example 1 was immersed in this slurry to coat the slurry on the lower layer. Then, excess slurry was blown off with air, and the substrate was dried by heating in an electric furnace at 120° C. for one hour. Finally, the substrate was immersed in Pt/Rh solution which had its concentration adjusted to 1.5/0.3 (g/mL), and then was fired to obtain a catalyst.

Example 4

A catalyst was prepared in the same manner as in Example 1, except that the porosity of the lower layer was varied. Thus, to 100 parts by weight of CZY Powder (trademark) manufactured by Cataler Co. and crushed in a ball mill for 100 hours, 10 parts by weight in solid content of zirconia sol (AC-7, manufactured by Daiichi Kigenso Chemical Industries Co.), 5 parts by weight of yttria sol (manufactured by Taki Chemical Co.) and a suitable amount of ion exchanged water were added and were mixed in a ball mill for one hour to prepare a slurry. To 100 parts by weight of this slurry, 10 wt % of polyethylene powder of 1 µm in particle diameter was added. The aforesaid carrier substrate was immersed in this slurry to coat the slurry onto the cell inner wall of the substrate. Then, excess slurry was blown off with air, and after the substrate was heated at 200° C. to evaporate polyethylene powder, firing was performed at 500° C. Finally, the carrier substrate having the lower layer formed thereon was immersed in Pt/Rh solution which had its concentration adjusted to 1.5/0.3 (g/L), and was fired to form the catalyst carrying lower layer. The upper layer was formed on the lower layer thus formed to obtain a catalyst.

Comparative Example 1

A catalyst was prepared in the same manner as in Example 2, except that the upper layer was formed in different thickness. Thus, to 100 parts by weight of zirconia powder, 10 parts by weight in solid component of zirconia sol (AC-7, manufactured by Daiichi Kigenso Chemical Industries Co.), and ion exchanged water were added to achieve solid content of 55.0%, and mixed in a ball mill for 24 hours to prepare a slurry. The carrier substrate having the lower layer prepared thereon as described in Example 1 was immersed in this slurry to coat the slurry on the lower layer. Then, excess slurry was blown off with air, and the substrate was dried by heating in an electric furnace at 120° C. for one hour. Finally, the substrate was immersed in Pt/Rh solution which had its concentration adjusted to 1.5/0.3 (g/mL), and then was fired to obtain a catalyst.

Comparative Example 2

A catalyst was prepared in the same manner as in Example 2, except that the upper layer was formed in different thickness. Thus, to 100 parts by weight of zirconia powder, 10 parts by weight in solid component of zirconia sol (AC-7, manufactured by Daiichi Kigenso Chemical Industries Co.), and ion exchanged water were added to achieve solid content of 47.0%, and mixed in a ball mill for 24 hours to prepare a slurry. The carrier substrate having the lower layer prepared thereon as described in Example 1 was immersed in this slurry to coat the slurry on the lower layer. Then, excess slurry was blown off with air, and the substrate was dried by heating in an electric furnace at 120° C. for one hour. Finally, the substrate was immersed in Pt/Rh solution which had its concentration adjusted to 1.5/0.3 (g/mL), and then was fired to obtain a catalyst.

Comparative Example 3

A catalyst was prepared in the same manner as in Example 2, except that the upper layer was formed of alumina. Thus, to 100 parts by weight of alumina powder, 10 parts by weight in solid component of alumina sol (AC200, manufactured by Nissan Chemical Industries Co.), and suitable amount of ion exchanged water were added and mixed in a ball mill for 24 hours to prepare a slurry. The carrier substrate having the lower layer prepared thereon as described in Example 1 was immersed in this slurry to coat the slurry on the lower layer. Then, excess slurry was blown off with air, and the substrate was dried by heating in an electric furnace at 120° C. for one hour. Finally, the substrate was immersed in Pt/Rh solution which had its concentration adjusted to 1.5/0.3 (g/mL), and then was fired to obtain a catalyst.

Comparative Example 4

A catalyst was prepared in the same manner as in Example 1, except that the porosity of the lower layer was varied. Thus, to 100 parts by weight of CZY Powder (trademark) manufactured by Cataler Co. and crushed in a ball mill for 100 hours, 10 parts by weight in solid component of zirconia sol (AC-7, manufactured by Daiichi Kigenso Chemical Industries Co.), 5 parts by weight of yttria sol (manufactured by Taki Chemical Co.) and a suitable amount of ion exchanged water were added and were mixed in a ball mill for one hour to prepare a slurry. To 100 parts by weight of this slurry, 5 wt % of polyethylene powder, 1 μm in particle diameter, was added. The aforesaid carrier substrate was immersed in this slurry to coat the slurry onto the cell inner wall of the substrate. Then, excess slurry was blown off with air, and after the substrate was heated at 200° C. to evaporate polyethylene powder, firing was performed at 500° C. Finally, the carrier substrate having the lower layer formed thereon was immersed in Pt/Rh solution which had its concentration adjusted to 1.5/0.3 (g/L), and was fired to form the catalyst carrying lower layer. The upper layer was formed on the lower layer thus formed in the same manner as in Example 1 to obtain a catalyst.

Evaluation

The catalysts prepared as described above were evaluated with respect to warming-up performance and heat insulation performance.

Evaluation of Warming-up Performance

The prepared catalyst was placed in a catalytic converter, and this was connected to a 4-cylinder engine of 2000 cc in displacement volume. The engine was started with air-fuel ratio (A/F) controlled to be 14.5. The spatial speed of the catalyst was chosen to be 13,000 h$^{-1}$. Cleaning ratio for HC, NO, and CO was derived from ratio of outlet gas concentration to inlet gas concentration, and time required for respective cleaning ratio to attain 90% or 95% was determined.

Evaluation of Heat Insulation Performance

The aforesaid engine was used, and a catalyst was warmed for 10 minutes with inlet gas temperature of 600° C. and catalyst temperature was measured using a thermocouple positioned at 10 mm from the last stage of the catalyst. Then, air was introduced from the inlet side of the catalyst at 13,000 h$^{-1}$, and temperature at 10 mm from the last stage was measured and time required for the temperature to arrive at 300° C. was determined.

These results are shown in Tables 1~3 below. Porosity was measured with a mercury porosimeter, and thermal conductivity was measured using laser flash method.

TABLE 1

| | Catalyst construction Upper layer//lower layer | Thickness of upper layer (μm) | Time to 50% cleaning (sec) |
|---|---|---|---|
| Example 1 | Pt—Rh/(Zr, Y)O$_2$//Pt—Rh/(Zr, Ce, Y)O$_2$ | 26 | 23 |
| Example 2 | Pt—Rh/ZrO$_2$//Pt—Rh/(Zr, Ce, Y)O$_2$ | 28 | 31 |
| Example 3 | Pt—Rh/ZrO$_2$//Pt—Rh/(Zr, Ce, Y)O$_2$ | 49 | 35 |
| Comparative example 1 | Pt—Rh/ZrO$_2$//Pt—Rh/(Zr, Ce, Y)O$_2$ | 64 | 45 |
| Comparative example 2 | Pt—Rh/ZrO$_2$//Pt—Rh/(Zr, Ce, Y)O$_2$ | 19 | 33 |

TABLE 2

| | Catalyst construction Upper layer//lower layer | Thermal conductivity [W/mK] | Thickness Upper layer [μm] | Time to 90% cleaning (sec) |
|---|---|---|---|---|
| Example 3 | Pt—Rh/ZrO$_2$//Pt—Rh/(Zr, Ce, Y)O$_2$ | 4.1 | 49 | 52 |
| Comparative example 3 | Pt—Rh/Al$_2$O$_3$//Pt—Rh/(Zr, Ce, Y)O$_2$ | 12.5 | 48 | 78 |

TABLE 3

| | Catalyst construction Upper layer//lower layer | Porosity [%] | Time to fall 600° C. → 300° C. [sec] |
|---|---|---|---|
| Example 1 | Pt—Rh/(Zr, Y)O$_2$//Pt—Rh/(Zr, Ce, Y)O$_2$ | 68 | 212 |
| Example 4 | Pt—Rh/(Zr, Y)O$_2$//Pt—Rh/(Zr, Ce, Y)O$_2$ | 56 | 201 |
| Comparative example 4 | Pt—Rh/(Zr, Y)O$_2$//Pt—Rh/(Zr, Ce, Y)O$_2$ | 31 | 181 |

Catalysts of Example 1~3, as compared to catalyst of Comparative example 1, exhibit shorter time to 50% cleaning and better warming-up performance (Table 1).

Thus, thickness of the upper layer should be 50 μm or less, preferably 20~30 μm, and more preferably, yttria is added to ZrO$_2$ (Example 1).

The catalyst of Example 3 exhibits shorter time to 90% cleaning ratio as compared to Comparative example 3, and has superior warming-up performance (Table 2).

Thermal conductivity is 4.1 W/mK for ZrO$_2$ and 12.5 W/mK for Al$_2$O$_3$, and therefore, it is desirable that ZrO$_2$ be used as material for forming the upper layer.

The catalysts of Example 1 and 4 exhibit longer time to fall 600° C.→300° C. as compared to Comparative example 4, and therefore have superior heat insulation performance (Table 3). Therefore, it is desirable that the lower layer have porosity of 40~75%.

The exhaust gas cleaning catalyst of the present invention has the construction of at least two catalyst carrying layers, with the upper layer formed of material having low thermal conductivity so as to improve warming-up performance at the time of cold start and the lower layer formed as a porous layer having porosity of 40~75% so as to improve heat insulation and heat storage performance. As a result, the warming-up performance of an engine to be warmed up to the activating temperature of the catalyst at the time of engine start can be improved.

What is claimed is:

1. An exhaust gas cleaning catalyst comprising:
    a carrier substrate;
    a catalyst carrying layer formed on the carrier substrate; and
    a noble metal catalyst carried by the catalyst carrying layer;
    wherein said catalyst carrying layer comprises at least two layers, and of the at least two layers, (1) a lower layer on the side of the carrier substrate is a metal oxide layer with porosity of 40 to 75%; and (2) an upper layer on the side of the top surface is a metal oxide layer having thermal conductivity of 5 W/mK or less, and
    said metal oxide constituting said upper layer is zirconia or zirconia added with 1 to 10 wt % of yttria, and the upper layer having a thickness of 20 to 50 μm.

2. The exhaust gas cleaning catalyst according to claim 1, wherein the lower layer is formed of at least one metal oxide selected from the group consisting of zirconia, ceria, titania, silica, magnesia, alumina, ceria-zirconia composite oxide, and composite oxide thereof.

3. The exhaust gas cleaning catalyst according to claim 2, wherein said metal oxide constituting said lower layer is ceria-zirconia composite oxide.

4. The exhaust gas cleaning catalyst according to claim 1, wherein an average pore diameter in said lower layer is 2 μm.

5. The exhaust gas cleaning catalyst according to claim 1, wherein a thickness of said lower layer is 60 μm.

6. The exhaust gas cleaning catalyst according to claim 1, wherein said metal oxide constituting said upper layer is zirconia added with 1 to 10 wt % of yttria.

7. The exhaust gas cleaning catalyst according to claim 1, wherein a porosity of said upper layer is 20%.

8. The exhaust gas cleaning catalyst according to claim 1, wherein an average pore diameter in said upper layer is 1 μm.

9. The exhaust gas cleaning catalyst according to claim 1, further comprising one or more intermediate layers between said lower layer and upper layer.

10. The exhaust gas cleaning catalyst according to claim 9, wherein said intermediate layer is formed of at least one metal oxide selected from the group consisting of silica, alumina, zirconia, and ceria.

* * * * *